(12) United States Patent
Sun et al.

(10) Patent No.: US 10,000,047 B2
(45) Date of Patent: Jun. 19, 2018

(54) METHOD FOR MANUFACTURING CURVED LIQUID CRYSTAL DISPLAY PANEL

(71) Applicant: WUHAN CHINA STAR OPTOELECTRONICS TECHNOLOGY CO. LTD., Hubei (CN)

(72) Inventors: Haiyan Sun, Guangdong (CN); Dejiun Li, Guangdong (CN); Tsungying Yang, Guangdong (CN); Dandan Liu, Guangdong (CN)

(73) Assignee: WUHAN CHINA STAR OPTOELECTRONICS TECHNOLOGY CO. LTD., Hubei (CN)

(*) Notice: Subject to any disclaimer, the term of this patent is extended or adjusted under 35 U.S.C. 154(b) by 515 days.

(21) Appl. No.: 14/772,389

(22) PCT Filed: May 15, 2015

(86) PCT No.: PCT/CN2015/079086
§ 371 (c)(1),
(2) Date: Sep. 3, 2015

(87) PCT Pub. No.: WO2016/176871
PCT Pub. Date: Nov. 10, 2016

(65) Prior Publication Data
US 2016/0347045 A1    Dec. 1, 2016

(30) Foreign Application Priority Data
May 7, 2015    (CN) .......................... 2015 1 0228329

(51) Int. Cl.
*G02F 1/1333*    (2006.01)
*G02F 1/1339*    (2006.01)
*G02F 1/1341*    (2006.01)
*B32B 37/10*    (2006.01)
*B32B 37/12*    (2006.01)
(Continued)

(52) U.S. Cl.
CPC .......... *B32B 37/1018* (2013.01); *B32B 37/12* (2013.01); *B32B 37/14* (2013.01); *B32B 38/1866* (2013.01); *G02F 1/1333* (2013.01); *G02F 1/1339* (2013.01); *G02F 1/1341* (2013.01); *B32B 2305/72* (2013.01); *B32B 2309/12* (2013.01); *B32B 2310/0831* (2013.01); *B32B 2457/202* (2013.01)

(58) Field of Classification Search
None
See application file for complete search history.

(56) References Cited

U.S. PATENT DOCUMENTS

2002/0062787 A1* 5/2002 Hashizume ......... B32B 38/1841
                                                              118/664
2015/0331076 A1* 11/2015 Neji ................... G01R 33/4835
                                                              324/309

* cited by examiner

*Primary Examiner* — Barbara J Musser
(74) *Attorney, Agent, or Firm* — Mark M. Friedman

(57) ABSTRACT

The present invention provides a method for manufacturing a curved liquid crystal display panel, which comprises coating a sealing gum on a first or a second frame sealing region; filing liquid crystals between the two substrates and adhering the two substrates together; performing a first curing on partial sealing gum on a first set or a third set of frame bodies; bending the first set and the third set of frame bodies obtained after the first curing along the extension direction of the first set of frame bodies; performing a second curing on uncured sealing gum on the two bended substrates.

17 Claims, 5 Drawing Sheets

(51) Int. Cl.
*B32B 37/14* (2006.01)
*B32B 38/18* (2006.01)

METHOD FOR MANUFACTURING CURVED LIQUID CRYSTAL DISPLAY PANEL

BACKGROUND OF THE INVENTION

1. Field of the Invention

The present invention relates to a display technology, and more particularly, to a method for manufacturing a curved liquid crystal display pane.

2. Description of Prior Art

As with development of display technology, curved liquid crystal display panels spring up. They are widely used due to a better visual experience accompanying with. In the existing manufacture method of the curved liquid crystal display panels, the display panel is usually manufactured with a planar structure and then a bending process is performed on the liquid crystal display panel with the planar structure so as to obtain the curved liquid crystal display panel.

In the existing curved liquid crystal display panels, a general manufacture method is to cure all the frame sealing regions of the planar first and second substrates and then perform the bending process. The materials of the first substrate and the second substrate of a common liquid crystal panel are glass. In the bending process, it is easily to damage the substrates upon a strong force applied to the panel since the stress may not be released.

Therefore, there is a need to provide a method for manufacturing a curved liquid crystal display panel for solving the problems occurred in conventional skills.

SUMMARY OF THE INVENTION

The objective of the present invention is to provide a method for manufacturing a curved liquid crystal display panel, for solving the technical problem of damaged substrates easily caused by bending or deformation force in conventional manufacture methods of the curved liquid crystal display panel.

To solve above problems, the technical schemes of the present invention are provided below.

The present invention provides a method for manufacturing a curved liquid crystal display panel, wherein the curved liquid crystal display panel comprises:

a first substrate having a first frame sealing region; the first substrate comprises a first set of frame bodies and a second set of frame bodies; the length of the first set of frame bodies is greater than that of the second set of frame bodies; a region formed by the first set of frame bodies and the second set of frame bodies is located outside a first projection region; the first frame sealing region is located inside the region formed by the first set of frame bodies and the second set of frame bodies; the first projection region is a projection of a display region on the first substrate; the first substrate further comprises a first setting region;

a second substrate opposite to the first substrate, having a second frame sealing region; the second substrate comprises a third set of frame bodies and a fourth set of frame bodies; the length of the third set of frame bodies is greater than that of the fourth set of frame bodies; a region formed by the third set of frame bodies and the fourth set of frame bodies is located outside a second projection region; the second frame sealing region is located inside the region formed by the third set of frame bodies and the fourth set of frame bodies; the second projection region is a projection of the display region on the second substrate; the second substrate further comprises a second setting region;

wherein initial structures of the first substrate and the second substrate are planar structures; the liquid crystal display panel with the planar structure has the display region;

the first setting region is located outside the first projection region and is not overlapped with the first frame sealing region;

the second setting region is located outside the second projection region and is not overlapped with the second frame sealing region;

the method for manufacturing the curved liquid crystal display panel comprises:

coating a sealing gum on partial region of the first frame sealing region and the first setting region; or coating the sealing gum on partial region of the second frame sealing region and the second setting region;

filing liquid crystals between the first substrate and the second substrate;

performing a vacuum lamination on the first substrate and the second substrate;

performing a first curing on partial sealing gum on the first set of frame bodies or partial sealing gum on the third set of frame bodies such that the first substrate and the second substrate is adhered to each other in a bending process;

bending the first set of frame bodies obtained after the first curing along an extension direction of the first set of frame bodies or along the extension direction of the third set of frame bodies; and bending the third set of frame bodies obtained after the first curing along the extension direction of the first set of frame bodies or along the extension direction of the third set of frame bodies; and performing a second curing on uncured sealing gum on the bended first substrate or uncured sealing gum on the bended second substrate so as to form the curved liquid crystal display panel;

wherein the step of performing the first curing on said partial sealing gum on the first set of frame bodies or said partial sealing gum on the third set of frame bodies comprises:

utilizing ultraviolet rays to irradiate said partial sealing gum on the first set of frame bodies or said partial sealing gum on the third set of frame bodies such that an initial cured sealing gum having a predetermined length is formed between the first set of frame bodies and the third set of frame bodies.

In the curved liquid crystal display panel according to the present invention, the first setting region is located between the first projection region and the first frame sealing region; and the second setting region is located between the second projection region and the second frame sealing region.

In the curved liquid crystal display panel according to the present invention, the first setting region is located outside the first frame sealing region; and the second setting region is located outside the second frame sealing region.

In the curved liquid crystal display panel according to the present invention, the step of the first curing comprises performing the curing only on the sealing gum on the first setting region or the sealing gum on the second setting region; the step of the second curing comprises performing the curing on the sealing gum on the bended first frame sealing region or the sealing gum on the beaded second frame sealing region.

In the curved liquid crystal display panel according to the present invention, the step of the first curing comprises performing the curing on the sealing gum on the first setting region and partial sealing gum on two strips of long edges of the first frame sealing region or performing the curing on the sealing gum on the second setting region and partial sealing gum on two strips of long edges of the second frame sealing region such that an integrated cured sealing gum is formed between the first substrate and the second substrate; the integrated cured sealing gum comprises a main portion and a combined portion connected to each other; the step of the second curing comprises performing the curing on uncured sealing gum on the bended first frame sealing region or uncured sealing gum on the bended second frame sealing region.

In the curved liquid crystal display panel according to the present invention, the main portion is formed by curing said partial sealing gum on the two strips of long edges of the first frame sealing region or by curing said partial sealing gum on the two strips of long edges of the second frame sealing region.

In the curved liquid crystal display panel according to the present invention, the curved liquid crystal display panel has a predetermined radius of curvature and a predetermined bending angle, and the predetermined length of the initial cured sealing gum is obtained according to the predetermined radius of curvature and the predetermined bending angle.

The embodiments of the present invention provide a method for manufacturing a curved liquid crystal display panel, wherein the curved liquid crystal display panel comprises:

a first substrate having a first frame sealing region; the first substrate comprises a first set of frame bodies and a second set of frame bodies; the length of the first set of frame bodies is greater than that of the second set of frame bodies; a region formed by the first set of frame bodies and the second set of frame bodies is located outside a first projection region; the first frame sealing region is located inside the region formed by the first set of frame bodies and the second set of frame bodies; the first projection region is a projection of a display region on the first substrate;

a second substrate opposite to the first substrate, having a second frame sealing region; the second substrate comprises a third set of frame bodies and a fourth set of frame bodies; the length of the third set of frame bodies is greater than that of the fourth set of frame bodies; a region formed by the third set of frame bodies and the fourth set of frame bodies is located outside a second projection region; the second frame sealing region is located inside the region formed by the third set of frame bodies and the fourth set of frame bodies; the second projection region is a projection of the display region on the second substrate;

wherein initial structures of the first substrate and the second substrate are planar structures; the liquid crystal display panel with the planar structure has the display region;

the method for manufacturing the curved liquid crystal display panel comprises:

coating a sealing gum on the first frame sealing region or the second frame sealing region;

filing liquid crystals between the first substrate and the second substrate;

performing a vacuum lamination on the first substrate and the second substrate;

performing a first curing on partial sealing gum on the first set of frame bodies or partial sealing gum on the third set of frame bodies such that the first substrate and the second substrate is adhered to each other in a bending process;

bending the first set of frame bodies obtained after the first curing along an extension direction of the first set of frame bodies or along the extension direction of the third set of frame bodies; and bending the third set of frame bodies obtained after the first curing along the extension direction of the first set of frame bodies or along the extension direction of the third set of frame bodies;

performing a second curing on uncured sealing gum on the bended first substrate or uncured sealing gum on the bended second substrate so as to form the curved liquid crystal display panel.

In the curved liquid crystal display panel according to the present invention, the first frame sealing region has two strips of long edges and the extension direction of the long edges of the first frame sealing region is parallel to the extension direction of the first set of frame bodies; the second frame sealing region also has two strips of long edges and the extension direction of the long edges of the second frame sealing region is parallel to the extension direction of the third set of frame bodies; and wherein the step of the first curing comprises performing the curing only on partial sealing gum on the two strips of long edges of the first frame sealing region or partial sealing gum on the two strips of long edges of the second frame sealing region.

In the curved liquid crystal display panel according to the present invention, the first substrate further comprises a first setting region; the second substrate further comprises a second setting region; the step of coating the sealing gum on the first frame sealing region or the second frame sealing region comprises: coating the sealing gum on partial region of the first frame sealing region and the first setting region; or coating the sealing gum on partial region of the second frame sealing region and the second setting region; wherein the first setting region is located outside the first projection region and is not overlapped with the first frame sealing region; the second setting region is located outside the second projection region and is not overlapped with the second frame sealing region.

In the curved liquid crystal display panel according to the present invention, the first setting region is located between the first projection region and the first frame sealing region; and the second setting region is located between the second projection region and the second frame sealing region.

In the curved liquid crystal display panel according to the present invention, the first setting region is located outside the first frame sealing region; and the second setting region is located outside the second frame sealing region.

In the curved liquid crystal display panel according to the present invention, the step of the first curing comprises performing the curing only on the sealing gum on the first setting region or the sealing gum on the second setting region; the step of the second curing comprises performing the curing on the sealing gum on the bended first frame sealing region or the sealing gum on the bended second frame sealing region.

In the curved liquid crystal display panel according to the present invention, the step of the first curing comprises performing the curing on the sealing gum on the first setting region and partial sealing gum on two strips of long edges of the first frame sealing region or performing the curing on the sealing gum on the second setting region and partial sealing gum on two strips of long edges of the second frame sealing region such that an integrated cured sealing gum is formed between the first substrate and the second substrate; the integrated cured sealing gum comprises a main portion and a combined portion connected to each other; the step of the second curing comprises performing the curing on uncured sealing gum on the bended first frame sealing region or uncured sealing gum on the bended second frame sealing region.

In the curved liquid crystal display panel according to the present invention, the main portion is formed by curing said partial sealing gum on the two strips of long edges of the first frame sealing region or by curing said partial sealing gum on the two strips of long edges of the second frame sealing region.

In the curved liquid crystal display panel according to the present invention, the step of performing the first curing on said partial sealing gum on the first set of frame bodies or said partial sealing gum on the third set of frame bodies comprises: utilizing ultraviolet rays to irradiate said partial sealing gum on the first set of frame bodies or said partial sealing gum on the third set of frame bodies such that an initial cured sealing gum having a predetermined length is formed between the first set of frame bodies and the third set of frame bodies.

In the curved liquid crystal display panel according to the present invention, the curved liquid crystal display panel has a predetermined radius of curvature and a predetermined bending angle, and the predetermined length of the initial cured sealing gum is obtained according to the predetermined radius of curvature and the predetermined bending angle.

In the manufacture method of the curved liquid crystal display panel according to the present invention, by only curing partial sealing gum on the long-edge frames of the two substrates before the bending process and then curing the remaining sealing gum after the bending process, the stress of the substrates occurred during the bending process can be reduced, thereby preventing the substrates from damaged.

To make above content of the present invention more easily understood, it will be described in details by using preferred embodiments in conjunction with the appending drawings.

DETAILED DESCRIPTION OF THE PREFERRED EMBODIMENTS

Figure 1:
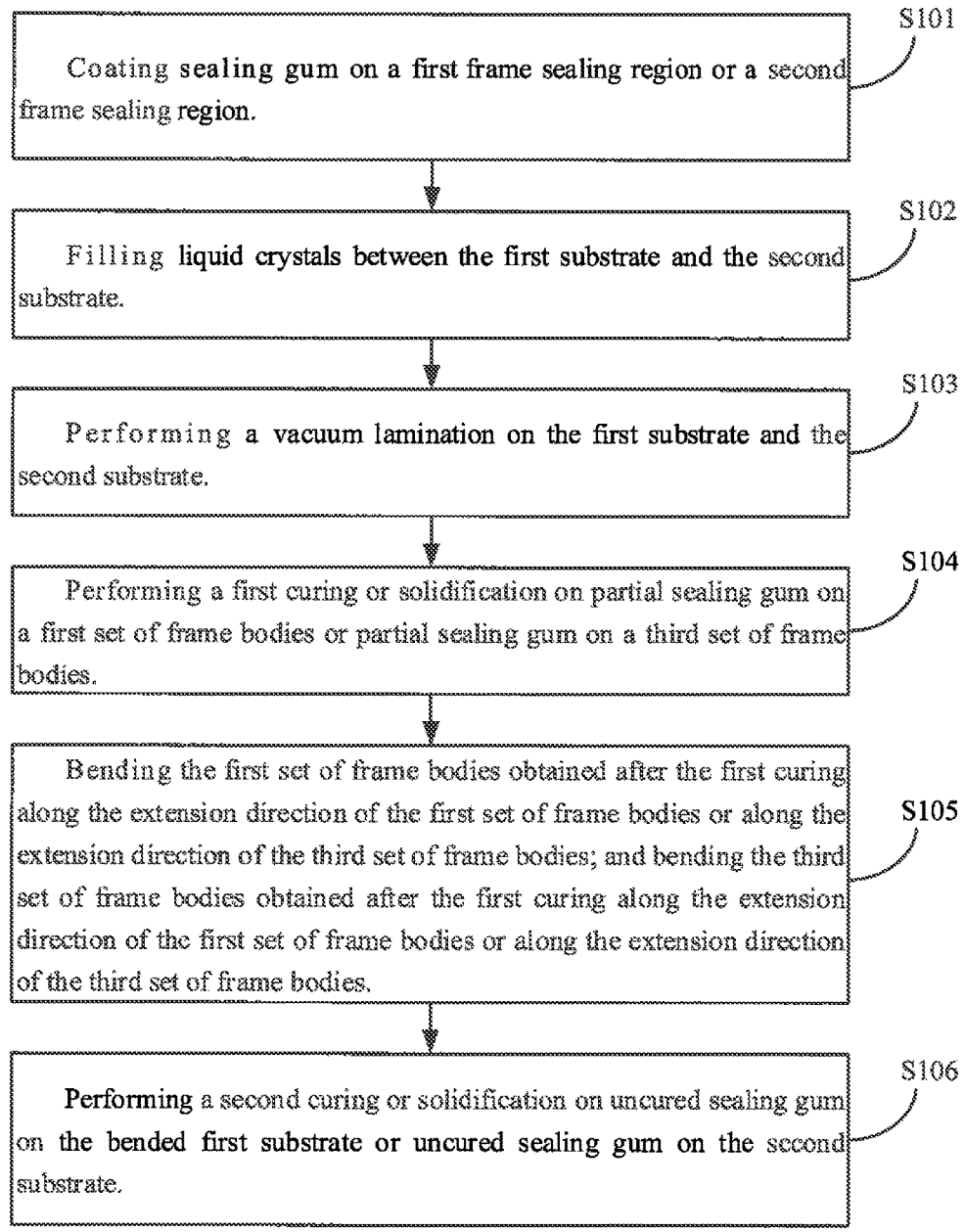
FIG. 1 is a flow chart of a method for manufacturing a curved liquid crystal display panel in accordance with the present invention.

The following descriptions for the respective embodiments are specific embodiments capable of being implemented for illustrations of the present invention with referring to the appended drawings. In the descriptions of the present invention, spatially relative terms, such as "upper", "lower", "front", "back", "left", "right", "inner", "outer", "lateral", and the like, may be used herein for ease of description as illustrated in the drawings. Therefore, it will be understood that the spatially relative terms are intended to illustrate for understanding the present invention, but not to limit the present invention.

In the drawings, units with similar structures are represented by the same reference numbers.

Please refer to FIG. 1, which is a flow chart of a method for manufacturing a curved liquid crystal display panel in accordance with the present invention.

Before assembled, the curved liquid crystal display panel may include a first substrate and a second substrate. The second substrate is opposite to the first substrate. The first substrate and the second substrate may be a color filter substrate and an array substrate, respectively. Alternatively, the first substrate includes common electrodes and the second substrate can be a COA (Color Filter on Array) substrate having a color filter layer and a thin-film transistor array layer disposed thereon. Of course, it can also be that the first substrate and the second substrate both have a polarizer respectively at their outer sides. The first substrate and the second substrate initially are planar structures. The planar structure of the liquid crystal display panel has a display region. The projection of the display region on the first substrate forms a first projection region. The projection of the display region on the second substrate forms a second projection region.

The first substrate has a first frame sealing region. The first substrate comprises a first set of frame bodies and a second set of frame bodies. The length of the first set of frame bodies is greater than that of the second set of frame bodies. The region formed or occupied by the first set of frame bodies and the second set of frame bodies is located outside the first projection region. The first frame sealing region is located inside the region formed by the first set of frame bodies and the second set of frame bodies, and the area occupied by the first frame sealing region is smaller than the region formed by the first set of frame bodies and the second set of frame bodies. In accompanying with FIG. 2, the first substrate 10 has the first projection region 101 and the first frame sealing region 102. The region formed or occupied by the first set of frame bodies 11 (e.g., two strips of long edge borders) and the second set of frame bodies 12 (e.g., two strips of short edge borders) is a region outside the first projection region 101.

The second substrate has a second frame sealing region. The second substrate comprises a third set of frame bodies (e.g., two strips of long edge borders) and a fourth set of frame bodies (e.g., two strips of short edge borders). The length of the third set of frame bodies is greater than that of the fourth set of frame bodies. The region formed or occupied by the third set of frame bodies and the fourth set of frame bodies is located outside the second projection region. The second frame sealing region is located inside the region formed by the third set of frame bodies and the fourth set of frame bodies. The second projection region is a projection of the display region on the second substrate.

The method for manufacturing the curved liquid crystal display panel comprises the following steps.

In Step S101, sealing gum is coated on the first frame sealing region or the second frame sealing region.

At the beginning of the manufacturing process, the first substrate and the second substrate both have two strips of long edge borders and two strips of short edge borders since the cross sections of the first substrate and the second substrate made along the display area are rectangles. The first set of frame bodies and the third set of frame bodies respectively correspond to the two strips of long edge borders and the second set of frame bodies and the fourth set of frame bodies respectively correspond to the two strips of short edge borders. In accompanying with FIG. 2, the first frame sealing region 102 is located outside the first projection region 101. The second frame sealing region is located outside the second projection region.

In Step S102, liquid crystals are filled between the first substrate and the second substrate.

By filling the liquid crystals between the first substrate and the second substrate, a liquid crystal display panel with a completely planar structure is obtained.

In Step S103, vacuum lamination is performed on the first substrate and the second substrate.

The first substrate and the second substrate are aligned to each other and then the two substrates are adhered to each other. The lamination or adhering process is performed under a vacuum environment for preventing from bubbles occurred in the panel or display failure.

In Step S104, a first curing or solidification is performed on partial sealing gum on the first set of frame bodies or partial sealing gum on the third set of frame bodies.

After Step S101 is finished, the first frame sealing region of the first substrate or the second frame sealing region of the second substrate is coated with sealing gum. The first frame sealing region is located inside the region formed or occupied by the first set of frame bodies and the second set of frame bodies. The curved liquid crystal display panel is typically bended along the long edge direction. Accordingly, irradiating partial sealing gum on one set of long edge frames of the first substrate with ultraviolet rays to cure it or irradiating partial sealing gum on one set of long edge frames of the second substrate with ultraviolet rays to cure it ensures that the first set of frame bodies and the third set of frame bodies are adhered together. Meanwhile, it is also assured that the first substrate and the second substrate are firmly adhered to each other, preventing the two substrate from departed in the bending process.

In Step S105, the first set of frame bodies obtained after the first curing is bended along the extension direction or lengthwise direction of the first set of frame bodies or along the extension direction or lengthwise direction of the third set of frame bodies; and the third set of frame bodies obtained after the first curing is bended along the extension direction or lengthwise direction of the first set of frame bodies or along the extension direction or lengthwise direction of the third set of frame bodies.

Since the first substrate and the second substrate are firmly adhered together after Step S104, the liquid crystal display panel with planar structure can then be bended along the extension direction of long edge frames, in which the extension direction of the first set of frame bodies and that of the third set of frame bodies are a same direction.

In Step S106, a second curing or solidification is performed on uncured sealing gum on the bended first substrate or uncured sealing gum on the second substrate.

Solidification or curing in Step S104 is only performed on partial sealing gum on the first set of frame bodies or partial sealing gum on the third set of frame bodies. To ensure the stability and firmness of the curved liquid crystal display panel, it needs to perform the second curing or solidification on the remaining sealing gum on the first substrate or the remaining sealing gum on the second substrate. After two times of solidification, the sealing gum on the first frame sealing region or the second frame sealing region should be completely cured.

In conventional manufacturing method of a curved liquid crystal display panel, the bending process is performed after coating sealing gum is finished and all the sealing gum of the frame sealing regions of the first substrate and the second substrate is cured. However, the solidification or curing of the sealing gum is divided into two steps in the present invention. That is, partial sealing gum on long edge frames is cured firstly. The remaining sealing gum is then cured after the bending process. Since the sealing gum on the two substrates is not completely fixed, a part of stress of the two substrates occurred during the bending process is released by way of the unfixed portion, thereby reducing the stress of the two substrates, preventing the two substrates from damaged, and reducing the manufacturing cost.

To further illustrate the afore-mentioned manufacturing method, the following descriptions give several different embodiments.

Figure 2:
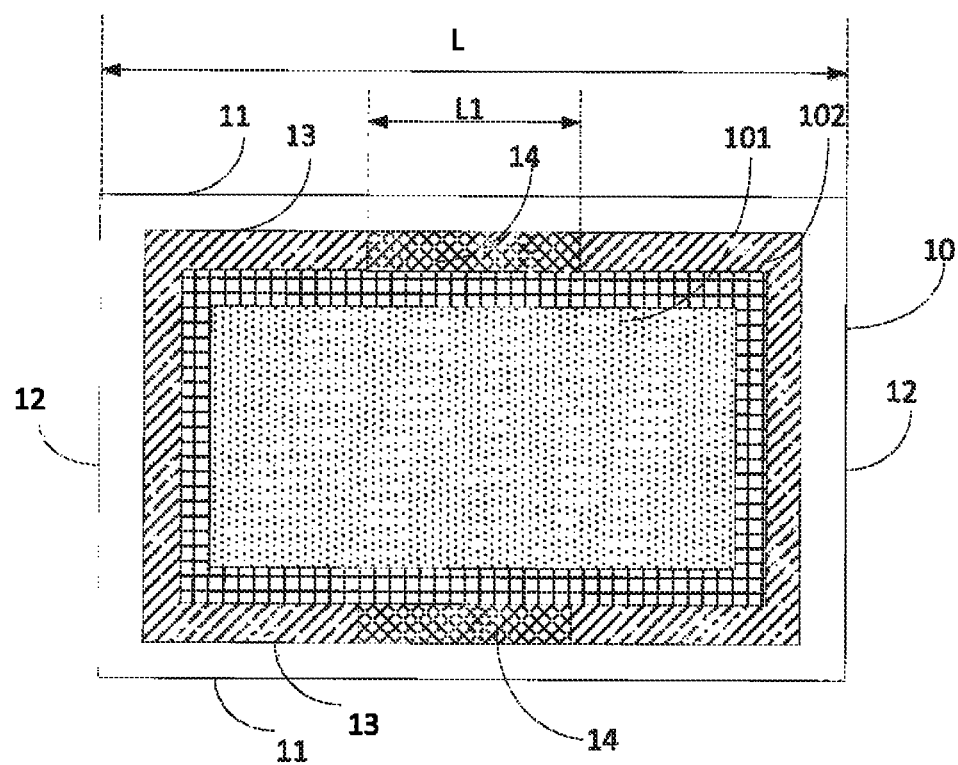
FIG. 2 is a top view of one of the substrates of the curved liquid crystal display panel in accordance with a first embodiment of the present invention.

FIG. 2 is a top view of one of the substrates of the curved liquid crystal display panel in accordance with a first embodiment of the present invention.

In Step S201, sealing gum is coated on the first frame sealing region or the second frame sealing region.

The shape of the first frame sealing region 102 is a shape of an overlapped portion of two rectangles having the same geometric center respectively with a large area and a small area. The first frame sealing region 102 has two strips of long edges 13. The extension direction of the long edges 13 of the first frame sealing region 102 is parallel to the extension direction of the first set of frame bodies 11.

Alternatively, FIG. 2 can also represent the second substrate. Also, the shape of the second frame sealing region is a shape of an overlapped portion of two rectangles having the same geometric center respectively with a large area and a small area. The second frame sealing region also has two strips of long edges. The extension direction of the long edges of the second frame sealing region is parallel to the extension direction of the third set of frame bodies.

In Step S202, liquid crystals are filled between the first substrate and the second substrate.

In Step S203, vacuum lamination is performed on the first substrate and the second substrate.

hi Step S204, curing or solidification is only performed on partial sealing gum on the two strips of long edges 13 of the first frame sealing region 102 or partial sealing gum on the two strips of long edges of the second frame sealing region.

Ultraviolet rays are utilized to irradiate partial sealing gum on the two strips of long edges 13 of the first frame sealing region 102 to cure said partial sealing gum and form an initially cured sealing gum 14. Alternatively, Ultraviolet rays are utilized to irradiate partial sealing gum on the two strips of long edges of the second frame sealing region to cure said partial sealing gum and form an initially cured sealing gum.

Preferably, to ensure stable adherence between the first substrate and the second substrate and prevent the two substrates from departed in the bending process, it can obtain the length of the initially cured sealing gum in advance. In accompanying with FIG. 6 and FIG. 2, the curved liquid crystal display panel has a predetermined radius of curvature r and a predetermined bending angle a. The predetermined radius of curvature r and the predetermined bending angle a may be pre-obtained in accordance with the size and material of the panel. The length of the liquid crystal display panel with planar structure is L. n is a central angle. The predetermined length of the initially cured sealing gum 14 is L1. Based on the predetermined radius of curvature r and the predetermined bending angle a, L1 may be obtained as follows.

The length L of the liquid crystal display panel with planar structure and the predetermined radius of curvature r of the curved liquid crystal display panel satisfy the following Equation (1).

$$L = n\pi r / 180° \quad (1)$$

Figure 6:
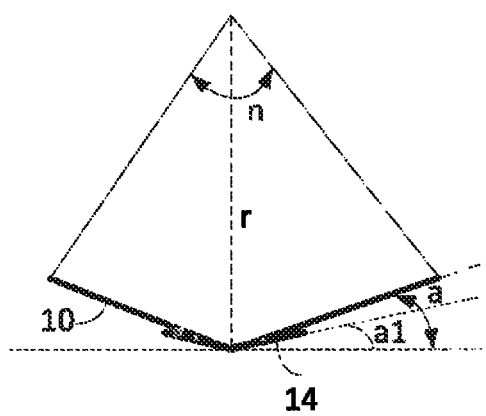
FIG. 6 is a schematic diagram showing a bended curved liquid crystal display panel in accordance with the present invention.

In accompanying with FIG. 6, L is the length of the liquid crystal display panel with planar structure, n is the central angle, r is the predetermined radius of curvature, the initially cured sealing gum 14 has a cured bending angle $a_1$, and a is the predetermined bending angle.

In accompanying with Equation (1), it can be known that the predetermined bending angle satisfies the following Equation (2).

$$n = 4a \quad (2)$$

In accompanying with Equations (1) and (2), it can be obtained that:

$$L = a\pi r / 45° \quad (3)$$

Similarly, the predetermined length of the initially cured sealing gum can be obtained as indicated in the following Equation (4).

$$L1 = a_1 \pi r / 45° \quad (4)$$

L1 is the predetermined length of the initially cured sealing gum 14, $a_1$ is the cured bending angle, r is the predetermined radius of curvature, and the cured bending angle is larger than one degree and is less than or equal to a.

In Step S205, the first set of frame bodies obtained after the first curing is bended along the extension direction or lengthwise direction of the first set of frame bodies or along the extension direction or lengthwise direction of the third set of frame bodies; and the third set of frame bodies obtained after the first curing is bended along the extension direction or lengthwise direction of the first set of frame bodies or along the extension direction or lengthwise direction of the third set of frame bodies.

In Step S206, a second curing or solidification is performed on uncured sealing gum on the bended first frame sealing region or uncured sealing gum on the second frame sealing region. That is, the portions except the cured sealing gum 14 on the frame sealing region 102 are to be cured.

Figure 3:
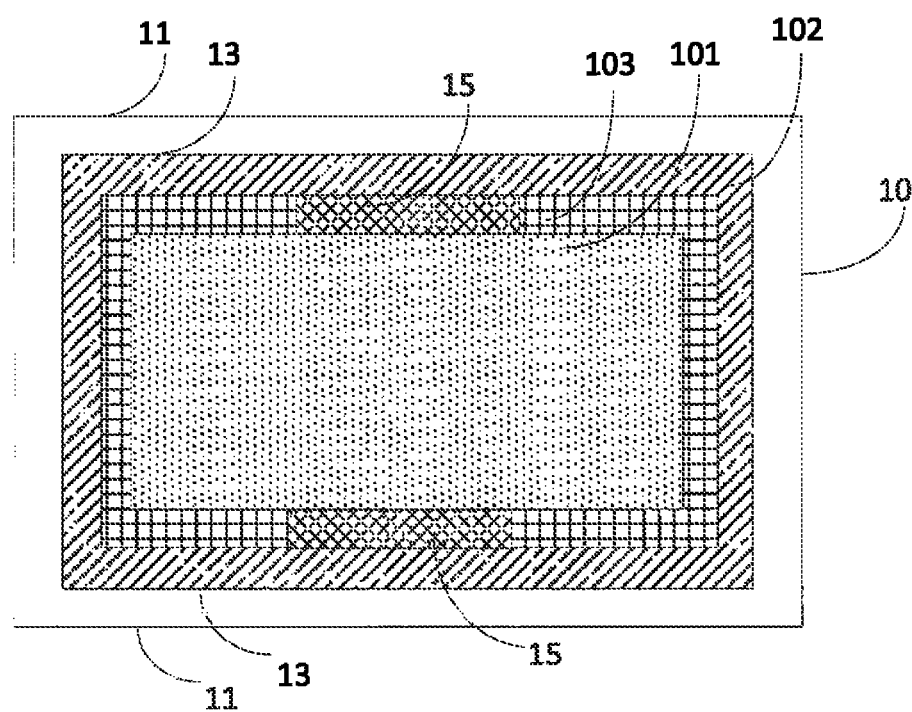
FIG. 3 is a top view of one of the substrates of the curved liquid crystal display panel in accordance with a second embodiment of the present invention.

FIG. 3 is a top view of one of the substrates of the curved liquid crystal display panel in accordance with a second embodiment of the present invention.

As illustrated with the first substrate in FIG. 3, the first substrate 10 further comprises a first setting region 103. The second substrate further comprises a second setting region.

in Step S301, sealing gum is coated on partial region of the first frame sealing region 102 and the first setting region 103. Alternatively, sealing gum is coated on partial region of the second frame sealing region and the second setting region.

Partial region (e.g., a region corresponding to a cured sealing gum 15) of the first setting region 103 is coated with sealing gum. The first setting region 103 is located outside the first projection region 101 and is not overlapped with the first frame sealing region 102. Further, the first setting region 103 is located between the first projection region 101 and the first frame sealing region 102.

The second setting region is located outside the second projection region and is not overlapped with the second frame sealing region. The second setting region is located between the second projection region and the second frame sealing region.

In Step S302, liquid crystals are filled between the first substrate and the second substrate.

In Step S303, vacuum lamination is performed on the first substrate and the second substrate.

In Step S304, curing or solidification is only performed on the sealing gum on the first setting region 103 or the sealing gum on the second setting region.

Ultraviolet rays are utilized to irradiate the sealing gum on the first setting region 103 to cure said partial sealing gum and form the cured sealing gum 15. Alternatively, Ultraviolet rays are utilized to irradiate the sealing gum on the second setting region to cure said partial sealing gum and form the cured sealing gum.

Preferably, to ensure stable adherence between the first substrate and the second substrate and prevent the two substrates from departed in the bending process, it can obtain the length of the cured sealing gum 15 in advance. The curved liquid crystal display panel has a predetermined radius of curvature r and a predetermined bending angle a. The predetermined radius of curvature r and the predetermined bending angle a may be pre-obtained in accordance with the size and material of the panel. The predetermined length of the cured sealing gum 15 may be obtained according to the predetermined radius of curvature r and the predetermined bending angle a. The approach to calculate L1 in the first embodiment is also applicable to calculation on the predetermined length of the cured sealing gum of the present embodiment.

In Step S305, the first set of frame bodies obtained after the first curing is bended along the extension direction or lengthwise direction of the first set of frame bodies or along the extension direction or lengthwise direction of the third set of frame bodies; and the third set of frame bodies obtained after the first curing is bended along the extension direction or lengthwise direction of the first set of frame bodies or along the extension direction or lengthwise direction of the third set of frame bodies.

In Step S306, curing or solidification is performed on the sealing gum on the bended first frame sealing region or the sealing gum on the second frame sealing region.

Disposing a first cured sealing gum on the frame sealing region may lead to uneven thickness of such partial sealing gum in the bending process, thereby resulting in liquid crystal leakage. However, in the present embodiment, even though uneven thickness of sealing gum may be occurred during the first curing, the liquid crystal leakage can be well prevented by disposing the first cured sealing gum between the frame sealing region and the projection region since sealing is also performed on the entire external frame sealing after the bending process.

Figure 4:
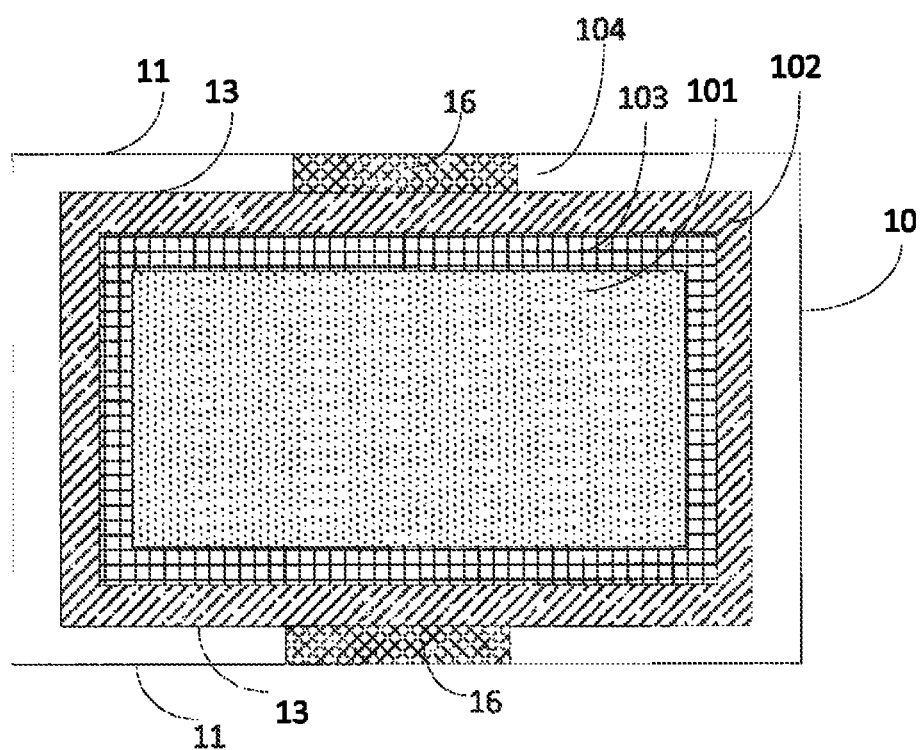
FIG. 4 is a top view of one of the substrates of the curved liquid crystal display panel in accordance with a third embodiment of the present invention.

FIG. 4 is a top view of one of the substrates of the curved liquid crystal display panel in accordance with a third embodiment of the present invention.

The differences between the present embodiment and the second embodiment are described below.

In the second embodiment, the first setting region 103 is located between the first projection region 101 and the first frame sealing region 102. In the present embodiment, as shown in FIG. 4, the first setting region 104 is located outside the first frame sealing region 102. Ultraviolet rays are utilized to irradiate the sealing gum on the first setting region 104 to cure said partial sealing gum and form the cured sealing gum 16. The approach to calculate L1 in the first embodiment is also applicable to calculation on the predetermined length of the cured sealing gum of the present embodiment.

Disposing a first cured sealing gum on the frame sealing region may lead to uneven thickness of such partial sealing gum in the bending process, thereby resulting in liquid crystal leakage. However, in the present embodiment, even though uneven thickness of sealing gum may be occurred during the first curing, the liquid crystal leakage can be well prevented by disposing the first cured sealing gum outside the frame sealing region since sealing is also performed on the entire inner frame sealing after the bending process.

Figure 5:
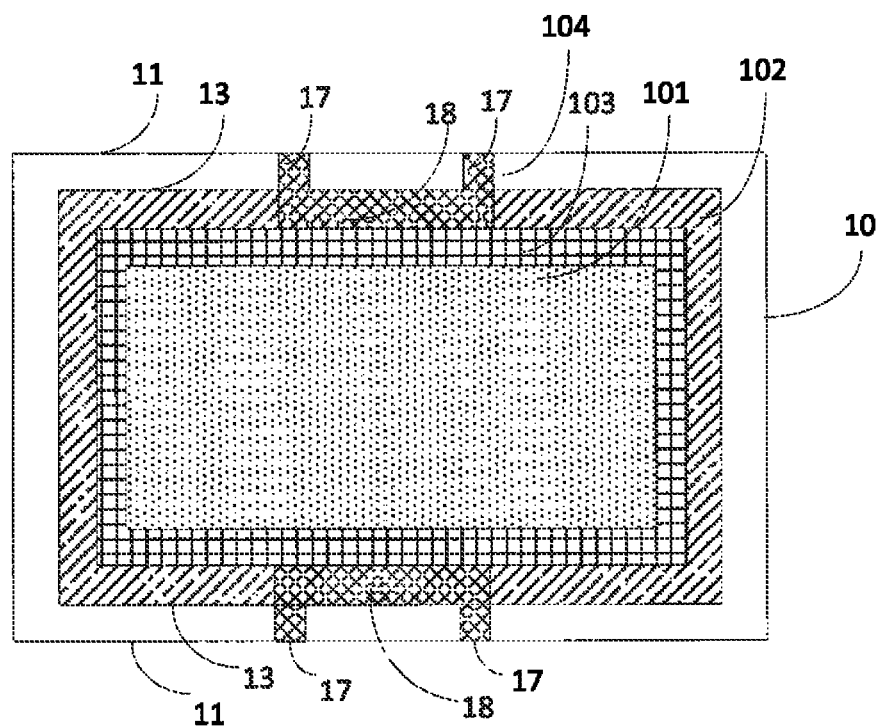
FIG. 5 is a top view of one of the substrates of the curved liquid crystal display panel in accordance with a fourth embodiment of the present invention.

FIG. 5 is a top view of one of the substrates of the curved liquid crystal display panel in accordance with a fourth embodiment of the present invention.

The differences between the present embodiment and the second embodiment are described below.

The first curing stage comprises the following.

In Step S501, curing or solidification is performed on the sealing gum on the first setting region and partial sealing gum on the two strips of long edges of the first frame sealing region. Alternatively, curing or solidification is performed on the sealing gum on the second setting region and partial sealing gum on the two strips of long edges of the second frame sealing region.

As shown in FIG. 5, the first setting region 104 has partial sealing gum coated thereon, for example. Such a partial sealing gum is irradiated with ultraviolet rays so as to form a cured sealing gum 17. Partial sealing gum on the two strips of long edges 13 of the first frame sealing region 102 is irradiated with ultraviolet rays so as to form a cured sealing gum 18. That is, by the first curing, an integrated cured sealing gum is formed between the first substrate and the second substrate. The integrated cured sealing gum comprises a main portion 18 and a combined portion 17 connected to each other.

The main portion 18 is formed by curing the partial sealing gum on the two strips of long edges of the first frame sealing region 102 or by curing the partial sealing gum on the two strips of long edges of the second frame sealing region. The combined portion 17 is formed by curing the sealing gum on the first setting region. The combined portion 17 may be consisted of one or more portions.

The shape of the combined portion 17 may be a rectangle. Preferably, the scope of coating the combined portion 17 can also be controlled during the coating process such that it has a certain shape. The shape of the main portion 18 may also be a rectangle. In a single one item situation, the length of the combined portion 17 can be less than or equal to that of the main portion 18. In a multiple item situation, the total length of the combined portion 17 can be less than or equal to that of the main portion 18. The first setting region 104 is not restricted to the positions indicated in FIG. 5. The first setting region 104 can also be located between the first projection region and the first frame sealing region, and can also be located outside the first frame sealing region. Similarly, the second setting region can also be located between the second projection region and the second frame sealing region, and can also be located outside the second frame sealing region. The combined portion 17 is also not restricted to the length and shape indicated in FIG. 5. Any approach able to increase adherence between the first substrate and the second substrate is implementable.

In Step S502, the second curing stage comprises curing or solidifying the uncured sealing gum on the bended first frame sealing region or the uncured sealing gum on the second frame sealing region.

For example, the sealing gum except the main portion 18 of the first frame sealing region 102 is cured such that all the sealing gum on the first frame sealing region or the second frame sealing region is cured and the manufacture of the curved liquid crystal display panel is finished.

Preferably, to ensure stable adherence between the first substrate and the second substrate and prevent the two substrates from departed in the bending process, it can obtain the length of the main portion 18 in advance. The curved liquid crystal display panel has a predetermined radius of curvature r and a predetermined bending angle a. The predetermined radius of curvature r and the predetermined bending angle a may be pre-obtained in accordance with the size and material of the panel. The predetermined length of the main portion 18 can be obtained according to the predetermined radius of curvature r and the predetermined bending angle a. The approach to calculate Li in the first embodiment is also applicable to calculation on the predetermined length of the main portion of the present embodiment.

In the present embodiment, first curing is performed on partial sealing gum on the frame sealing region. Also, the setting region located outside the display region is coated with the sealing gum and the first curing is also performed on such partial sealing gum. Therefore, the adherence between the first substrate and the second substrate is increased, and it is helpful for the bending of the panel.

In the manufacture method of the curved liquid crystal display panel according to the present invention, by only curing partial sealing gum on the long-edge frames of the two substrates before the bending process and then curing the remaining sealing gum after the bending process, the stress of the substrates occurred during the bending process can be reduced, thereby preventing the substrates from damaged.

Although the present invention has been illustrated by the preferred embodiments described above, it should be understood for the ordinary skilled person in the art that the present invention is not limited to the embodiments, but rather various changes or modifications thereof are possible without departing from the spirit of the invention. Accordingly, the scope of the invention shall be determined by the appended claims.

What is claimed is:

1. A method for manufacturing a curved liquid crystal display panel, wherein:
the curved liquid crystal display panel comprises:
a first substrate having a first frame sealing region; the first substrate comprises a first set of frame bodies and a second set of frame bodies; the length of the first set of frame bodies is greater than that of the second set of frame bodies; a region formed by the first set of frame bodies and the second set of frame bodies is located outside a first projection region; the first frame sealing region is located inside the region formed by the first set of frame bodies and the second set of frame bodies; the first projection region is a projection of a display region on the first substrate;

a second substrate opposite to the first substrate, having a second frame sealing region; the second substrate comprises a third set of frame bodies and a fourth set of frame bodies; the length of the third set of frame bodies is greater than that of the fourth set of frame bodies; a region formed by the third set of frame bodies and the fourth set of frame bodies is located outside a second projection region; the second frame sealing region is located inside the region formed by the third set of frame bodies and the fourth set of frame bodies; the second projection region is a projection of the display region on the second substrate;

wherein initial structures of the first substrate and the second substrate are planar structures; the liquid crystal display panel with the planar structure has the display region;

the method for manufacturing the curved liquid crystal display panel comprises:

coating a sealing gum on the first frame sealing region or the second frame sealing region;

filling liquid crystals between the first substrate and the second substrate;

performing a vacuum lamination on the first substrate and the second substrate;

performing a first curing on partial sealing gum on the first set of frame bodies or partial sealing gum on the third set of frame bodies such that the first substrate and the second substrate is adhered to each other in a bending process;

bending the first set of frame bodies obtained after the first curing along an extension direction of the first set of frame bodies or along the extension direction of the third set of frame bodies; and bending the third set of frame bodies obtained after the first curing along the extension direction of the first set of frame bodies or along the extension direction of the third set of frame bodies;

performing a second curing on uncured sealing gum on the bended first substrate or uncured sealing gum on the bended second substrate so as to form the curved liquid crystal display panel.

2. The method for manufacturing the curved liquid crystal display panel according to claim 1, wherein the first frame sealing region has two strips of long edges and the extension direction of the long edges of the first frame sealing region is parallel to the extension direction of the first set of frame bodies; the second frame sealing region also has two strips of long edges and the extension direction of the long edges of the second frame sealing region is parallel to the extension direction of the third set of frame bodies; and wherein the step of the first curing comprises performing the curing only on partial sealing gum on the two strips of long edges of the first frame sealing region or partial sealing gum on the two strips of long edges of the second frame sealing region.

3. The method for manufacturing the curved liquid crystal display panel according to claim 1, wherein the first substrate further comprises a first setting region; the second substrate further comprises a second setting region; the step of coating the sealing gum on the first frame sealing region or the second frame sealing region comprises:

coating the sealing gum on partial region of the first frame sealing region and the first setting region; or coating the sealing gum on partial region of the second frame sealing region and the second setting region;

wherein the first setting region is located outside the first projection region and is not overlapped with the first frame sealing region; the second setting region is located outside the second projection region and is not overlapped with the second frame sealing region.

4. The method for manufacturing the curved liquid crystal display panel according to claim 3, wherein the first setting region is located between the first projection region and the first frame setting region; and the second setting region is located between the second projection region and the second frame sealing region.

5. The method for manufacturing the curved liquid crystal display panel according to claim 3, wherein the first setting region is located outside the first frame sealing region; and the second setting region is located outside the second frame sealing region.

6. The method for manufacturing the curved liquid crystal display panel according to claim 3, wherein:

the step of the first curing comprises performing the curing only on the sealing gum on the first setting region or the sealing gum on the second setting region;

the step of the second curing comprises performing the curing on the sealing gum on the bended first frame sealing region or the sealing gum on the bended second frame sealing region.

7. The method for manufacturing the curved liquid crystal display panel according to claim 3, wherein:

the step of the first curing comprises performing the curing on the sealing gum on the first setting region and partial sealing gum on two strips of long edges of the first frame sealing region or performing the curing on the sealing gum on the second setting region and partial sealing gum on two strips of long edges of the second frame sealing region such that an integrated cured sealing gum is formed between the first substrate and the second substrate; the integrated cured sealing gum comprises a main portion and a combined portion connected to each other;

the step of the second curing comprises performing the curing on uncured sealing gum on the bended first frame sealing region or uncured sealing gum on the bended second frame sealing region.

8. The method for manufacturing the curved liquid crystal display panel according to claim 7, wherein the main portion is formed by curing said partial sealing gum on the two strips of long edges of the first frame sealing region or by curing said partial sealing gum on the two strips of long edges of the second frame sealing region.

9. The method for manufacturing the curved liquid crystal display panel according to claim 1, wherein the step of performing the first curing on said partial sealing gum on the first set of frame bodies or said partial sealing gum on the third set of frame bodies comprises:

utilizing ultraviolet rays to irradiate said partial sealing gum on the first set of frame bodies or said partial sealing gum on the third set of frame bodies such that an initial cured sealing gum having a predetermined length is formed between the first set of frame bodies and the third set of frame bodies.

10. The method for manufacturing the curved liquid crystal display panel according to claim 9, wherein the curved liquid crystal display panel has a predetermined radius of curvature and a predetermined bending angle, and the predetermined length of the initial cured sealing gum is obtained according to the predetermined radius of curvature and the predetermined bending angle.

11. A method for manufacturing a curved liquid crystal display panel, wherein:
the curved liquid crystal display panel comprises:
a first substrate having a first frame sealing region; the first substrate comprises a first set of frame bodies and a second set of frame bodies; the length of the first set of frame bodies is greater than that of the second set of frame bodies; a region formed by the first set of frame bodies and the second set of frame bodies is located outside a first projection region; the first frame sealing region is located inside the region formed by the first set of frame bodies and the second set of frame bodies; the first projection region is a projection of a display region on the first substrate; the first substrate further comprises a first setting region;
a second substrate opposite to the first substrate, having a second frame sealing region; the second substrate comprises a third set of frame bodies and a fourth set of frame bodies; the length of the third set of frame bodies is greater than that of the fourth set of frame bodies; a region formed by the third set of frame bodies and the fourth set of frame bodies is located outside a second projection region; the second frame sealing region is located inside the region formed by the third set of frame bodies and the fourth set of frame bodies; the second projection region is a projection of the display region on the second substrate; the second substrate further comprises a second setting region;
wherein initial structures of the first substrate and the second substrate are planar structures; the liquid crystal display panel with the planar structure has the display region;
the first setting region is located outside the first projection region and is not overlapped with the first frame sealing region;
the second setting region is located outside the second projection region and is not overlapped with the second frame sealing region;
the method for manufacturing the curved liquid crystal display panel comprises:
coating a sealing gum on partial region of the first frame sealing region and the first setting region; or coating the sealing gum on partial region of the second frame sealing region and the second setting region;
filling liquid crystals between the first substrate and the second substrate;
performing a vacuum lamination on the first substrate and the second substrate;
performing a first curing on partial sealing gum on the first set of frame bodies or partial sealing gum on the third set of frame bodies such that the first substrate and the second substrate is adhered to each other in a bending process;
bending the first set of frame bodies obtained after the first curing along an extension direction of the first set of frame bodies or along the extension direction of the third set of frame bodies; and bending the third set of frame bodies obtained after the first curing along the extension direction of the first set of frame bodies or along the extension direction of the third set of frame bodies; and performing a second curing on uncured sealing gum on the bended first substrate or uncured sealing gum on the bended second substrate so as to form the curved liquid crystal display panel;
wherein the step of performing the first curing on said partial sealing gum on the first set of frame bodies or said partial sealing gum on the third set of frame bodies comprises:
utilizing ultraviolet rays to irradiate said partial sealing gum on the first set of frame bodies or said partial sealing gum on the third set of frame bodies such that an initial cured sealing gum having a predetermined length is formed between the first set of frame bodies and the third set of frame bodies.

12. The method for manufacturing the curved liquid crystal display panel according to claim 11, wherein the first setting region is located between the first projection region and the first frame sealing region; and the second setting region is located between the second projection region and the second frame sealing region.

13. The method for manufacturing the curved liquid crystal display panel according to claim 11, wherein the first setting region is located outside the first frame sealing region; and the second setting region is located outside the second frame sealing region.

14. The method for manufacturing the curved liquid crystal display panel according to claim 11, wherein:
the step of the first curing comprises performing the curing only on the sealing gum on the first setting region or the sealing gum on the second setting region;
the step of the second curing comprises performing the curing on the sealing gum on the bended first frame sealing region or the sealing gum on the bended second frame sealing region.

15. The method for manufacturing the curved liquid crystal display panel according to claim 11, wherein:
the step of the first curing comprises performing the curing on the sealing gum on the first setting region and partial sealing gum on two strips of long edges of the first frame sealing region or performing the curing on the sealing gum on the second setting region and partial sealing gum on two strips of long edges of the second frame sealing region such that an integrated cured sealing gum is formed between the first substrate and the second substrate; the integrated cured sealing gum comprises a main portion and a combined portion connected to each other;
the step of the second curing comprises performing the curing on uncured sealing gum on the bended first frame sealing region or uncured sealing gum on the bended second frame sealing region.

16. The method for manufacturing the curved liquid crystal display panel according to claim 15, wherein the main portion is formed by curing said partial sealing gum on the two strips of long edges of the first frame sealing region or by curing said partial sealing gum on the two strips of long edges of the second frame sealing region.

17. The method for manufacturing the curved liquid crystal display panel according to claim 11, wherein the curved liquid crystal display panel has a predetermined radius of curvature and a predetermined bending angle, and the predetermined length of the initial cured sealing gum is obtained according to the predetermined radius of curvature and the predetermined bending angle.

* * * * *